United States Patent [19]

Buschmann et al.

[11] Patent Number: 5,195,811
[45] Date of Patent: Mar. 23, 1993

[54] CIRCUIT CONFIGURATION FOR AN ELECTRONICALLY CONTROLLED ANTI-LOCK BRAKE SYSTEM

[75] Inventors: Bunther Buschmann, Griesheim; Frank Jourdan, Buettelborn, both of Fed. Rep. of Germany

[73] Assignee: Alfred Teves GmbH, Frankfurt am Main, Fed. Rep. of Germany

[21] Appl. No.: 911,245

[22] Filed: Jul. 6, 1992

Related U.S. Application Data

[63] Continuation of Ser. No. 658,138, Feb. 20, 1991, abandoned.

[30] Foreign Application Priority Data

Feb. 20, 1990 [DE] Fed. Rep. of Germany ....... 4005264

[51] Int. Cl.$^5$ .......................... B60T 8/40; B60T 13/68; B60T 15/08
[52] U.S. Cl. ............................. 303/116 R; 303/119 R
[58] Field of Search .............. 303/61, 113 TR, 119 R, 303/103, 111, 113 AP, 116 R, 100

[56] References Cited

U.S. PATENT DOCUMENTS

| | | | |
|---|---|---|---|
| 4,668,023 | 5/1987 | Every et al. | 303/100 |
| 4,826,258 | 5/1989 | Ocvirk et al. | 303/113 TR |
| 4,828,338 | 5/1989 | Ocvirk et al. | 303/113 TR |
| 4,840,436 | 6/1989 | Burgdor et al. | 303/117 TR |
| 4,852,953 | 8/1989 | Brearly et al. | 303/111 |
| 4,900,105 | 2/1990 | Burgdorf et al. | 303/113 TR |

FOREIGN PATENT DOCUMENTS

| | | |
|---|---|---|
| 3609707 | 10/1986 | Fed. Rep. of Germany . |
| 3522226 | 1/1987 | Fed. Rep. of Germany . |
| 3541742 | 5/1987 | Fed. Rep. of Germany . |
| 3612185 | 10/1987 | Fed. Rep. of Germany . |
| 3627000 | 2/1988 | Fed. Rep. of Germany . |
| 3744070 | 7/1989 | Fed. Rep. of Germany . |
| 3817179 | 11/1989 | Fed. Rep. of Germany . |
| 2193771 | 8/1986 | United Kingdom . |
| 2204653 | 5/1987 | United Kingdom . |

OTHER PUBLICATIONS

Literature: Huber, Werner; U. A. Simulation, Performance and Traction Control Published by: Society of Automotive Engineers, Inc.

*Primary Examiner*—Joseph F. Peters, Jr.
*Assistant Examiner*—Virna Lissi Ansley
*Attorney, Agent, or Firm*—Robert P. Seitter; J. Gordon Lewis

[57] ABSTRACT

There is suggested a circuit configuration for an electronically controlled anti-lock brake system, wherein upon the commencement of braking pressure control pressure fluid is pumped out of a supply reservoir (13) into the pressure chambers 7, 8) of the tandem master cylinder (1) which closes the inlet valves (14 to 17) of all wheels at the onset of the control action. It regulates the braking pressure on the imminently locking wheels by opening and closing the inlet valves and outlet valves (14 to 17 and 22 to 25) in a known fashion, while on the non-locking wheels it slowly adapts the braking pressure to the pressure prevailing in the tandem master cylinder (1) by way of pulsewise actuation at a predefinable pulse-pause ratio, that means opening and closing of the inlet valves (14 to 17).

3 Claims, 2 Drawing Sheets

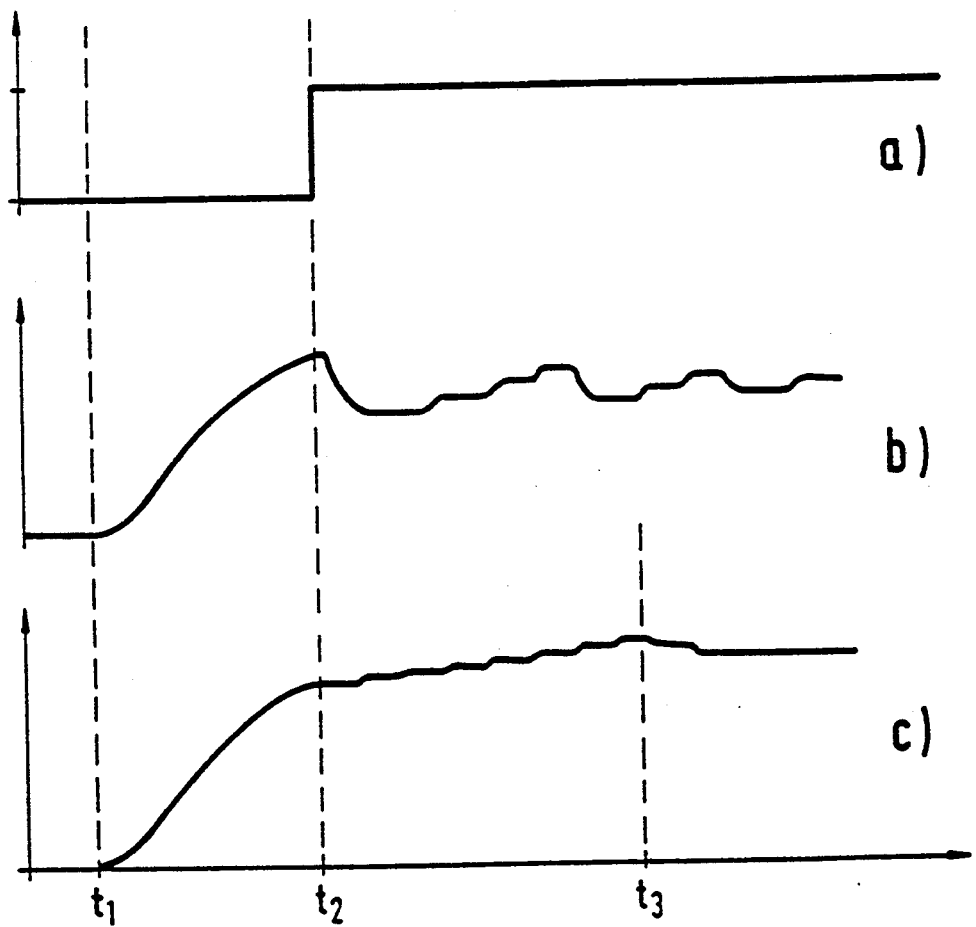

CIRCUIT CONFIGURATION FOR AN ELECTRONICALLY CONTROLLED ANTI-LOCK BRAKE SYSTEM

This application is a continuation of application Ser. No. 07/658,138 filed Feb. 20, 1991 now abandoned.

INTRODUCTION

The present invention related to a circuit configuration for an electronically controlled anti-lock brake system comprising inlet valves and outlet valves inserted into the brake lines and actuatable for the purpose of anti-lock control, comprising a master cylinder and at least one pump which is adapted to be switched on when control is needed and which supplies pressure fluid out of a supply reservoir into the working chambers of the master cylinder.

BACKGROUND OF THE INVENTION

A like brake system is known e.g. from DE 36 27 000 A1. Furthermore, methods are already known and made use of in automotive vehicles, wherein in each case the braking pressure of the imminently locking wheels is regulated by virtue of the inlet valves and outlet valves as well as the electronic circuitries. The braking pressure on the wheels devoid of a tendency to lock remains unaffected.

In the majority of cases, admittedly, the known control methods for operating a brake system like described above are very effective and guarantee safe braking and mastering of the automotive vehicle. However, an undesirable situation will be encountered under extreme conditions.

When gentle braking is initiated for instance on a snowy road surface, that means the brake pedal is depressed only a small amount, and if any one wheel, e.g. VR, shows a tendency to lock, the pumps will be driven to deliver pressure fluid out of the supply reservoir into the brake circuits. The braking pressure is regulated on the wheel VR showing the tendency to lock. Since the pumps are designed such that they return a sufficient amount of pressure fluid into the brake circuits even if control is effected on all wheels, in the event of only one wheel being controlled they will deliver so much pressure fluid into the brake circuits that the pressure rises there. Due to the pressure being increased in the master cylinder as well, augmented force will react on the foot of the driver placed on the brake pedal. However, since the average driver applies the brake pedal not in a force-proportional manner but in a travel-proportional way, he/she will yield the higher pressure after a few seconds only and will not release the pedal until then.

In the meantime, that means after the pressure increase and before the pedal release, the following happens:

Caused by the increased braking pressure, even the wheels which had not been jeopardized by wheel lock so far may reach the limit of wheel lock and will then be governed corresponding to the prevailing high braking pressure level. The driver had not intended to brake so strongly and may get startled. In case another vehicle rides behind such an unexpectedly vigorously braked automotive vehicle, an accident will possibly occur.

BRIEF DESCRIPTION OF THE INVENTION

The present invention has for its object to eliminate the abovedescribed shortcoming. This object is achieved in a surprisingly straightforward manner in that in the event of a locking tendency on at least one wheel the circuit configuration will first of all close all inlet valves, and in that, during regulation of the braking pressure in the wheel brake of the imminently locking wheel, it opens and/or closes the inlet valves of the other wheels by pulsewise actuation in a predeterminable pulse-pause ratio. It is accomplished by this measure that the braking pressure build-up on the wheel snot jeopardized by wheel lock takes place in a slightly delayed manner and that thus the braking pressure on these wheels will rise but moderately during the reaction time of the driver which the latter needs to release the pedal because of the increased pressure.

It is particularly favorable when the circuit configuration closes the inlet valves on the wheels unendangered by wheel lock for a period approximately four times as long as it opens them. In the presence of this pulse-pause ratio, the pressure build-up in the wheel brakes of the wheels unendangered by wheel lock takes place in a delayed fashion, on the one hand, yet, on the other hand, fast enough in order to safeguard safe and quick braking of the vehicle at any time.

In an expedient manner, the circuit configuration closes the inlet valves on the wheels unendangered by wheel lock in each case for 28 milliseconds and opens them thereafter for 7 milliseconds. This opening and closing is continued cyclical.

DETAILED DESCRIPTION OF THE PREFERRED EMBODIMENT

Figure 1:
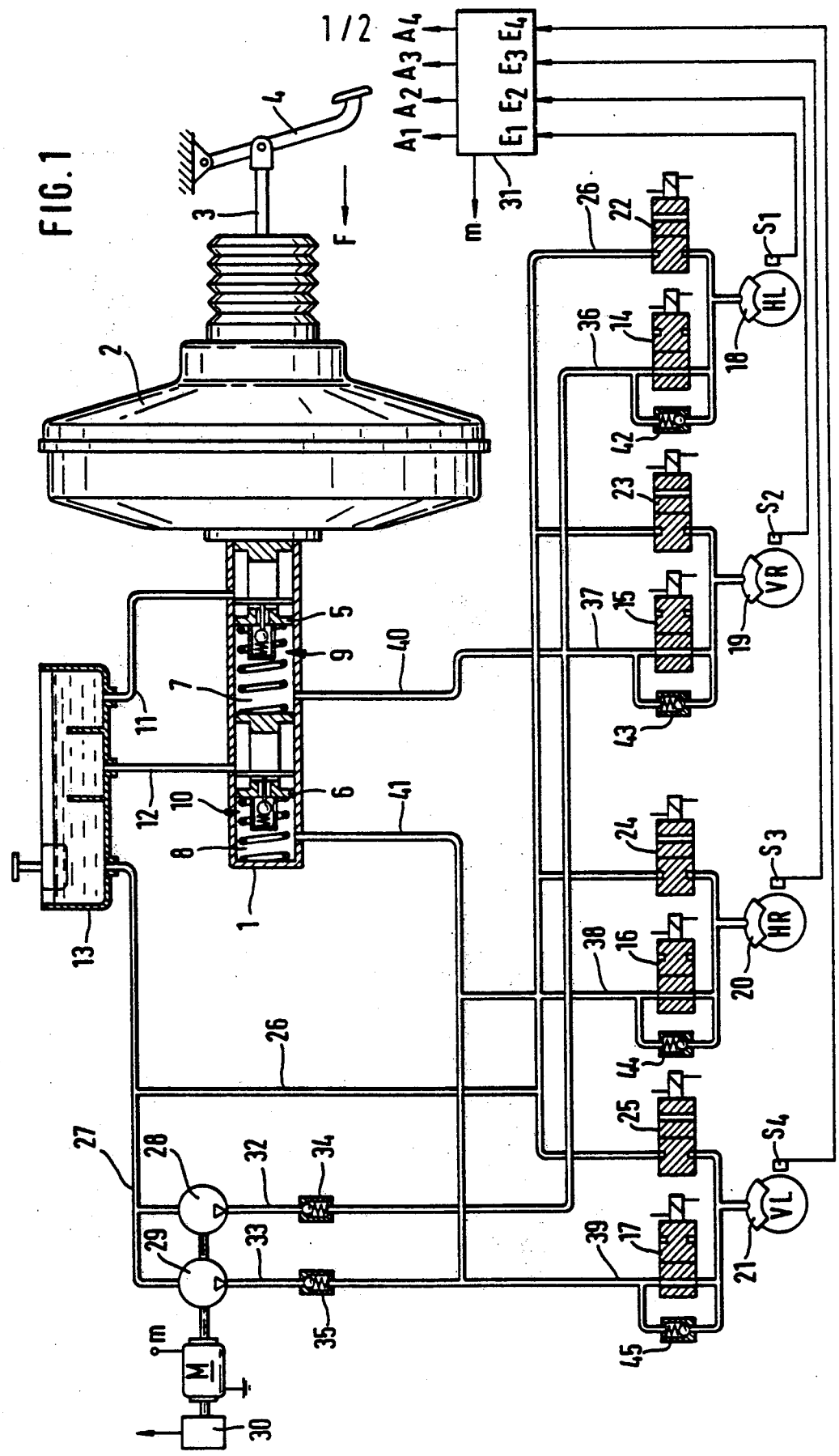
FIG. 1, shows schematically a brake system permitting application of the inventive circuit configuration; and in FIG. 2, the variation of the braking pressure against time is shown on a wheel braked with and a wheel braked without anti-lock control, and the pumps' condition is shown for comparison.

FIG. 1 depicts a tandem master cylinder 1 with a vacuum brake power booster 2 connected upstream thereof. Via a push rod 3, the pedal force F applied to a brake pedal 4 is transmitted onto the vacuum brake power booster 2 and from there, boosted by auxiliary force, onto working pistons 5 and 6 of the tandem master cylinder 1 in a known manner.

In the illustrated release position of the brake, pressure chambers 7, 8 of the master cylinder 1 communicate with a supply reservoir 13 via open central control valves 9, 10 and via hydraulic lines 11, 12. The two pressure chambers 7 and 8 are connected with the wheel brakes 18, 19, 20 and 21 via two main brake lines 40, 41 and the branch lines 36, 37, 38 and 39 in which electromagnetically actuatable inlet valves 14, 15, 16 and 17 are inserted which are open in their initial position. The parallel connected wheel brakes 18 and 19 and 20 and 21, respectively, are allocated to the diagonals.

Moreover, the wheel brakes 18 to 21 connect to electromagnetically actuatable outlet valves 22, 23, 24 and 25 which are closed in their initial position and which communicate via a hydraulic return line 26 with the supply reservoir 13, on the one hand, and via the suction line 27 with the suction sides of pumps 28 and 29, on the other hand. The pumps are electromotively (motor M) driven hydraulic pumps. The electric connections "m" and "Masse" (ground) are also illustrated symbolically. Besides, there is provision of an electrically operating function-monitoring device 30 which serves to check the mode of operation of the motor M.

The vehicle wheels VR, VL, HR and HL are equipped with inductive sensors S1 to S4 which generate electric signals indicative of the wheel rotational behavior, that means the wheel speed and variations thereof. These signals are fed via the inputs E1 to E4 to the electronic circuit configuration 31 which generates braking-pressure control signals serving to temporarily switch over the inlet and outlet valves 14 to 17 and 22 to 25 on detection of an imminent locked condition and to thereby keep the braking pressure constant, to decrease it and to re-increase it at the appropriate time. To this end, the actuating magnets of the inlet and outlet valves 17 to 17 and 22 to 25 are driven via the outputs A1 to A4. The electric connecting lines between the ports A1 to A4 and the coils of the valves 14 to 17 and 22 to 25 are not illustrated for the sake of simplicity.

The electronic circuit configuration 31 can be realized in a known fashion by hard-wired circuits or by programmed electronic units such as microcomputers or microcontrollers.

The switch-on signal for the start-up of the motor M of the pumps 28, 29 which must run during a slip control action is applied to the motor M via the connection m.

The brake system operates as follows: on brake application the pedal force F boosted by the vacuum in the brake power booster 2 is transmitted onto the working pistons 5 and 6. The central control valves 9 and 10 close, thus allowing braking pressure to now develop in the pressure chambers 7 and 8 and hence in the main brake lines 40 and 41 which, via the opened inlet valves 14 to 17 propagates to the wheel brakes 18 to 21.

On detection of an imminent locked condition at one or more of the wheels by means of the sensors S1 to S4 and the electronic circuit configuration 31, slip control will commence. The motor M of the pumps 28, 29 will be switched on, whereby pressure develops in the two supply lines 32 and 33 which propagates via the non-return valves 34, 35 and the branch lines 36, 37, 38 and 39 to the now closed inlet valves 14 to 17, on the one hand, and which acts upon the pressure chambers 7 and 8 of the tandem master cylinder 1, on the other hand. Further displacement of the working pistons 5, 6 in the direction of the pedal force F as well as evacuation of the pressure chambers 7 and 8 is prevented, since now pressure fluid from the pumps 28, 29 flows via the supply lines 32, 33, the opened non-return lines 34, 35 and the main rake lines 40, 41 into the pressure chambers 7 and 8 and tends to urge the pistons 5 and 6 back into their initial position.

On wheels not tending to lock, the actual braking pressure variation in the wheel brakes 18 to 21 is adapted to the braking pressure level now prevailing in the master cylinder 1 by way of regularly opening and closing the inlet valves 14 to 17, while on the imminently locking wheels it is controlled by opening the inlet valves and outlet valves 14 to 17 and 22 to 25 corresponding to the control signals issued by the electronic circuit configuration 31.

As is discernible from the drawing, the inlet valves 14 to 17 are guarded still by non-return valve 42, 43, 44 and 45 connected in parallel. These non-return valves 42 to 45 enable in special cases, in particular on pedal release, after pressure reduction in the brake circuits to terminate the braking pressure control and/or to release the wheel brakes, since a small quantity of pressure fluid can flow out of the wheel brakes 18 to 21 back into the pressure chambers 7 and 8 even if the inlet valve and outlet valves 14 to 17 and 22 to 25 are closed, in the event that the working pistons 5 and 6 of the tandem master cylinder are moved back by reduction of the pedal force F and/or when the central control valves 8 and 10 are in their opened position.

It can be seen in FIG. 2a that at the onset of braking the pumps are disconnected and are switched on when the control commences at the point of time t2. FIG. 2b shows the braking pressure variation on a wheel braked with anti-lock control. Starting from the point of time t1 marking the start of braking, the braking pressure rises roughly exponentially. As soon as a locking tendency is sensed at the point of time t2, the braking pressure will be kept constant and thereafter decreased and re-increased stepwise. As soon as the locking tendency re-occurs, braking pressure will be decreased further and reincreased. FIG. 2c shows the braking pressure variation on a wheel braked without anti-lock control. Herein, too, the pressure rises in parallel to the braking pressure variation in FIG. 2b roughly exponentially from the point of time t1 to the point of time t2. With the commencement of the control, that is at the point of time t2, it will in each case be kept constant for a short time and increased by a small amount until a maximum value is reached. As soon as the driver releases the pedal, the pressure will be somewhat decreased, this is the point of time t3 in the FIG.

What is claimed is:

1. A anti-lock brake system for use in a traction vehicle including a plurality of wheels and associated brakes, said system comprising:
   - a master cylinder;
   - inlet and outlet valves in circuit with brake lines interconnecting said master cylinder and wheel brakes, said valves selectively actuatable to effect anti-lock control;
   - at least one pump operable to draw pressure fluid from a reservoir and discharge fluid to said master cylinder at an elevated pressure; and
   - a control device for detecting an imminent locked condition on at least one wheel and for energizing said pump in response thereto, said control device including means for actuating all said inlet valves to a closed condition wherein upon said imminent locked condition all said inlet and outlet valves are closed upon initial detection of said imminent locked condition and thereafter for modulating braking pressure applied to an associated brake of said imminently locked wheel and means for alternately opening and closing the inlet valves of the remaining wheels by predetermined pulsewise actuation of inlet valves associated therewith.

2. An anti-lock brake system as claimd in claim 1, wherein said means for alternately opening and closing the inlet valves of the remaining wheels include means for keeping the inlet valves on the wheels unendangered by wheel lock closed for a period of approximately 4 times as long as they are opened.

3. An anti-lock brake system as claimed in claim 2, wherein said means for keeping the inlet valves on the wheels unendangered by wheel lock closed for a period of approximately 4 times as long as they are opened include means for closing the inlet valves on the wheels unendangered by wheel lock for about 28 milliseconds and thereafter for opening them for about 7 milliseconds during one cycle.

* * * * *